United States Patent
Beard, III et al.

(10) Patent No.: US 10,518,830 B2
(45) Date of Patent: Dec. 31, 2019

(54) CLIMBING VEHICLE USING SUCTION WITH VARIABLE ADAPTIVE SUSPENSION SEAL

(71) Applicants: James Walter Beard, III, Cookeville, TN (US); Stephen Lee Canfield, Cookeville, TN (US); David Andrew Bryant, Lebanon, TN (US); Steve Glovsky, Franklin, TN (US)

(72) Inventors: James Walter Beard, III, Cookeville, TN (US); Stephen Lee Canfield, Cookeville, TN (US); David Andrew Bryant, Lebanon, TN (US); Steve Glovsky, Franklin, TN (US)

( * ) Notice: Subject to any disclaimer, the term of this patent is extended or adjusted under 35 U.S.C. 154(b) by 0 days.

(21) Appl. No.: 15/368,530

(22) Filed: Dec. 2, 2016

(65) Prior Publication Data
US 2018/0154960 A1 Jun. 7, 2018

Related U.S. Application Data

(60) Provisional application No. 62/263,494, filed on Dec. 4, 2015.

(51) Int. Cl.
*B62D 57/024* (2006.01)

(52) U.S. Cl.
CPC ........ *B62D 57/024* (2013.01); *B60Y 2200/47* (2013.01)

(58) Field of Classification Search
CPC ...... B62D 57/024; B62D 57/04; B62D 57/00; B25J 15/06; B60Y 2200/47
See application file for complete search history.

(56) References Cited

U.S. PATENT DOCUMENTS

| | | | | |
|---|---|---|---|---|
| 3,268,023 A * | 8/1966 | Di Napoli, Jr. | ........ | B60V 3/025 180/124 |
| 4,095,378 A * | 6/1978 | Urakami | ................. | B24C 3/062 114/222 |
| 4,688,289 A * | 8/1987 | Urakami | ................... | B08B 1/04 114/222 |
| 4,809,383 A * | 3/1989 | Urakami | ................... | B08B 1/04 114/222 |

(Continued)

*Primary Examiner* — Kevin Hurley
*Assistant Examiner* — Michael R Stabley

(57) ABSTRACT

A climbing vehicle with wheel or endless-track type propulsion using suction for generating adhering forces is adapted to climbing non-planar surfaces such as intersecting walls, pipes or other structural members. The suction chamber is relatively fixed to the vehicle chassis and moves with the vehicle chassis. A seal is created around the suction chamber through an adaptive sealing mechanism. The adaptive sealing mechanism consists of a series of links that adapt to the climbing surface geometry and forms a seal at the climbing surface. The links in the adaptive sealing mechanism span a portion of the suction chamber along the longitudinal sides of the vehicle and are elastically sprung to maintain contact with the surface. The adaptive sealing mechanism links also span the lateral sides of the vehicle to fully enclose the suction chamber. Thus, the suction chamber is maintained even as the mobile vehicle passes over significant geometry changes in the climbing surface, for example transitioning between surfaces that are orthogonally opposed.

16 Claims, 10 Drawing Sheets

Climbing vehicle on an irregular surface.

(56) References Cited

U.S. PATENT DOCUMENTS

| | | | | |
|---|---|---|---|---|
| 4,860,400 | A * | 8/1989 | Urakami | B08B 1/04 |
| | | | | 114/222 |
| 4,926,957 | A * | 5/1990 | Urakami | B62D 57/024 |
| | | | | 114/222 |
| 5,014,803 | A * | 5/1991 | Urakami | B62D 57/024 |
| | | | | 114/222 |
| 5,121,805 | A * | 6/1992 | Collie | B62D 57/024 |
| | | | | 180/8.1 |
| 5,536,199 | A * | 7/1996 | Urakami | B62D 57/00 |
| | | | | 15/98 |
| 5,592,998 | A * | 1/1997 | Urakami | B62D 57/00 |
| | | | | 180/164 |
| 5,752,577 | A * | 5/1998 | Urakami | B62D 57/00 |
| | | | | 180/164 |
| 6,102,145 | A * | 8/2000 | Fisher | B08B 3/024 |
| | | | | 180/164 |
| 6,105,695 | A * | 8/2000 | Bar-Cohen | B62D 57/02 |
| | | | | 180/8.5 |
| 6,913,524 | B2 * | 7/2005 | Urakami | B62D 57/02 |
| | | | | 269/21 |
| 7,520,356 | B2 * | 4/2009 | Sadegh | B62D 49/0621 |
| | | | | 180/127 |
| 7,753,755 | B2 * | 7/2010 | Clark, Jr. | A63H 17/26 |
| | | | | 446/117 |
| 7,775,312 | B2 * | 8/2010 | Maggio | B62D 49/0635 |
| | | | | 15/340.1 |
| 7,980,916 | B2 * | 7/2011 | Clark, Jr. | A63H 17/26 |
| | | | | 446/177 |

* cited by examiner

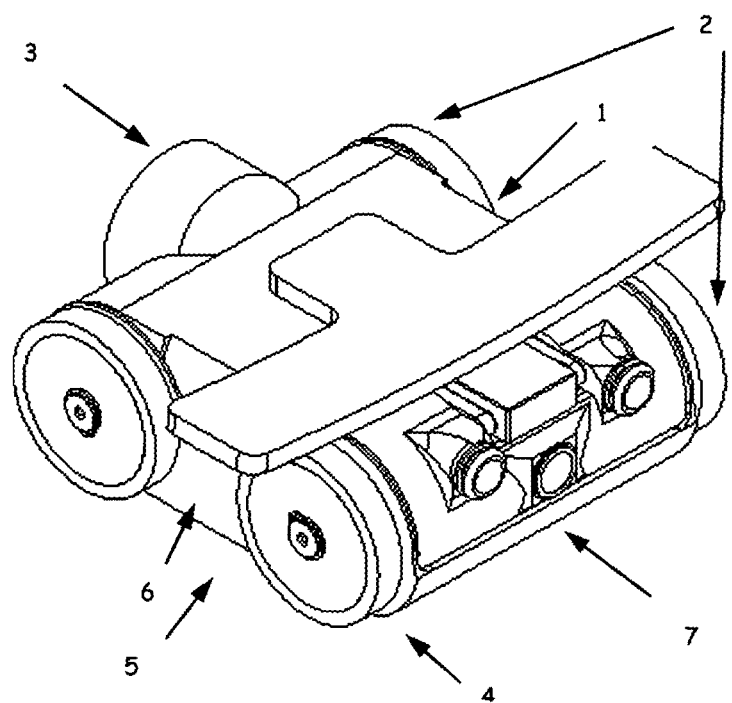
Fig. 1: Isometric view of the basic form of the invention

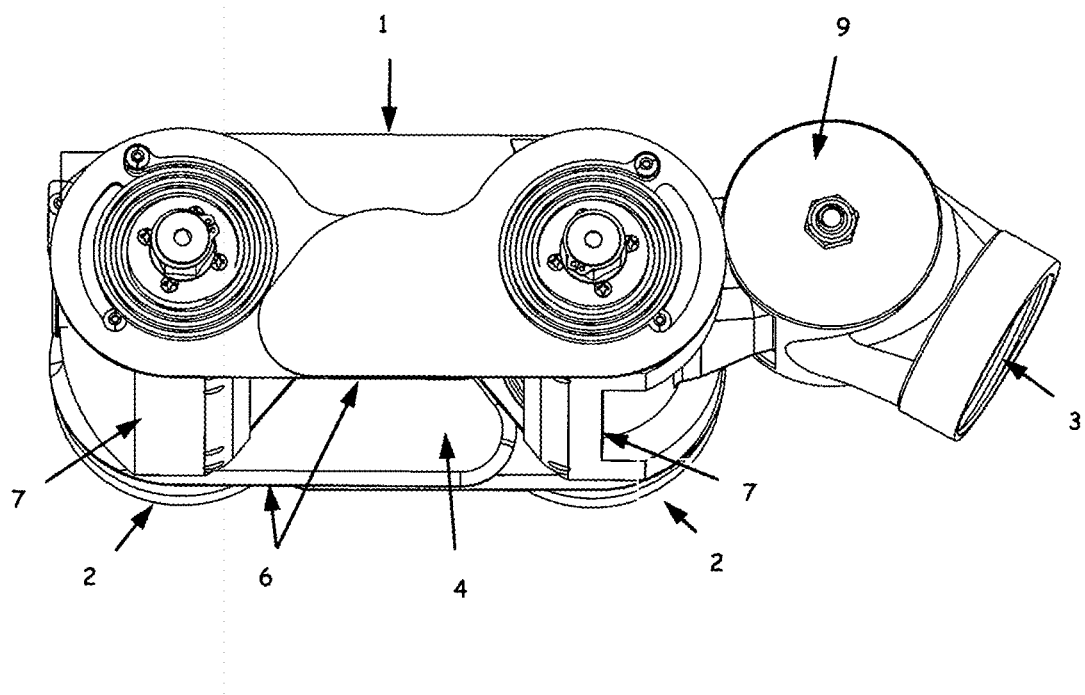
Fig. 2: Side view of the basic form of the invention

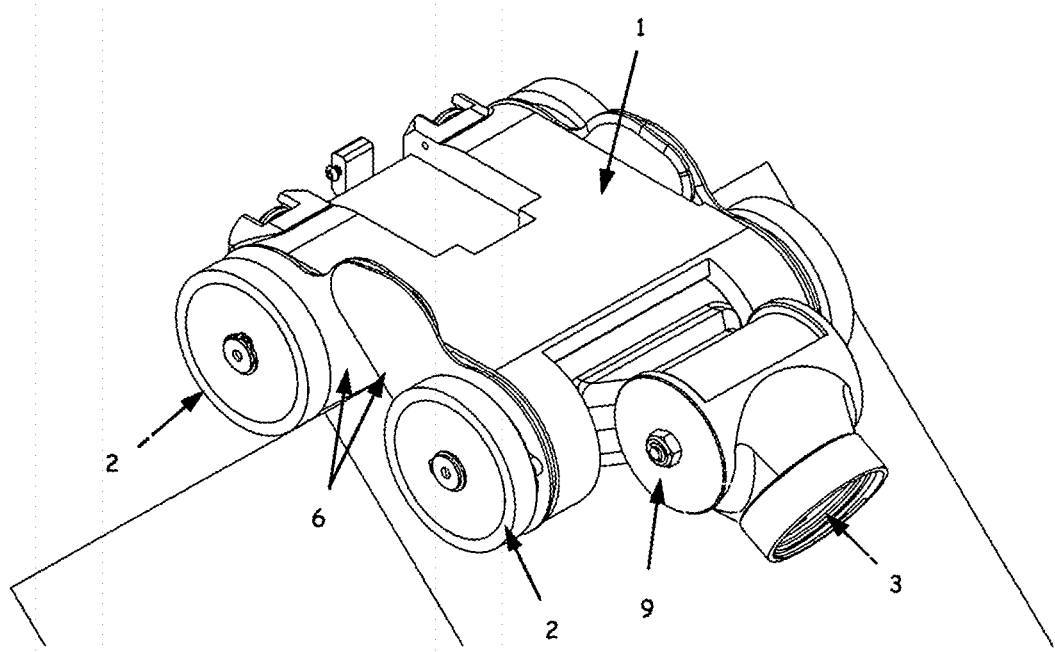
Fig. 3: Climbing vehicle on an irregular surface.

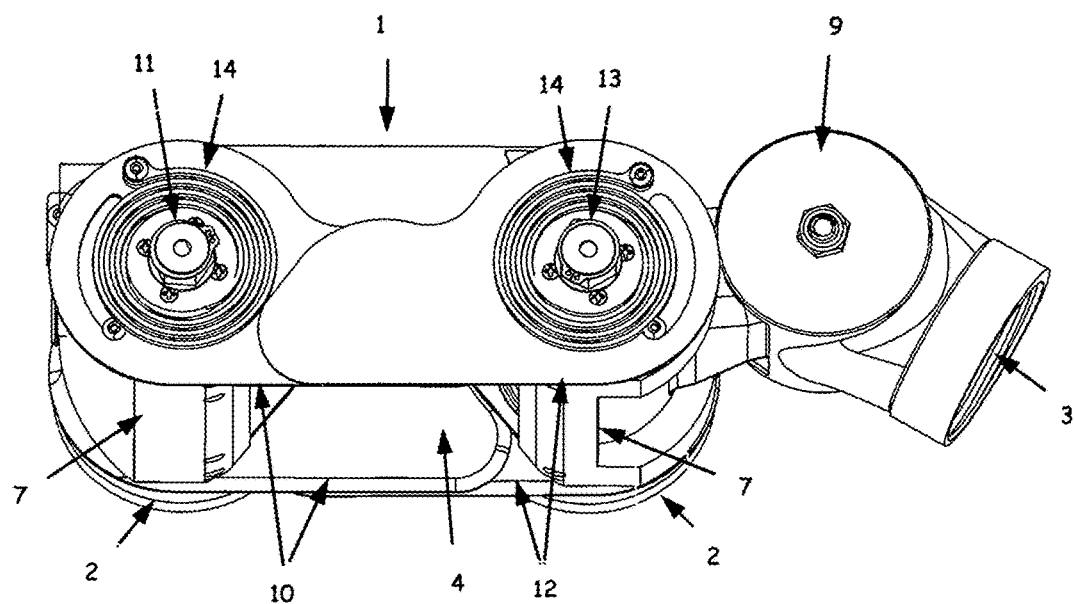
Fig. 4 Side view of climbing vehicle showing detail of basic form of longitudinal seal mechanism

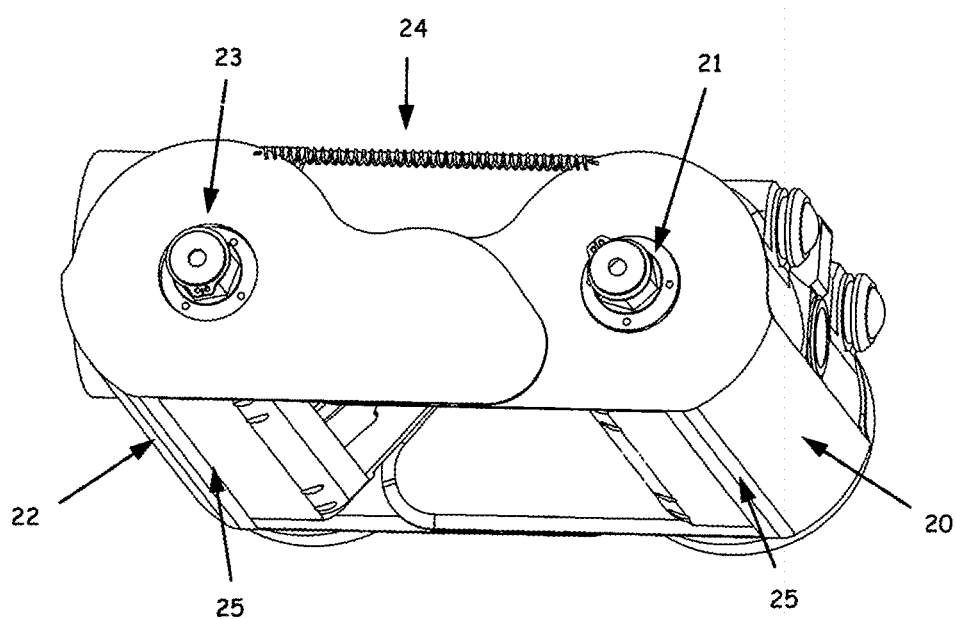
Fig. 5 Side view of climbing vehicle showing detail of basic form of lateral side links

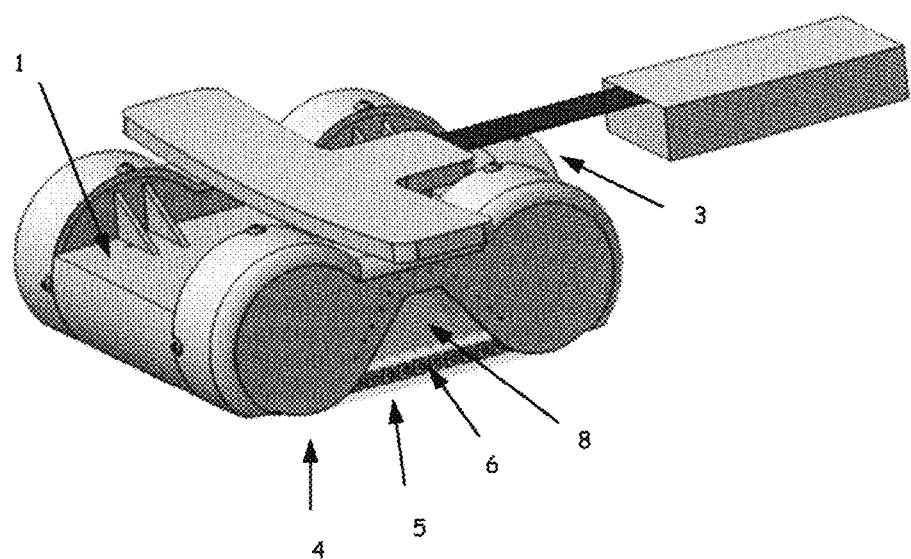
Fig. 6: Isometric view of alternate form of invention in which adaptive sealing mechanism is a combination of rigid and flexible components

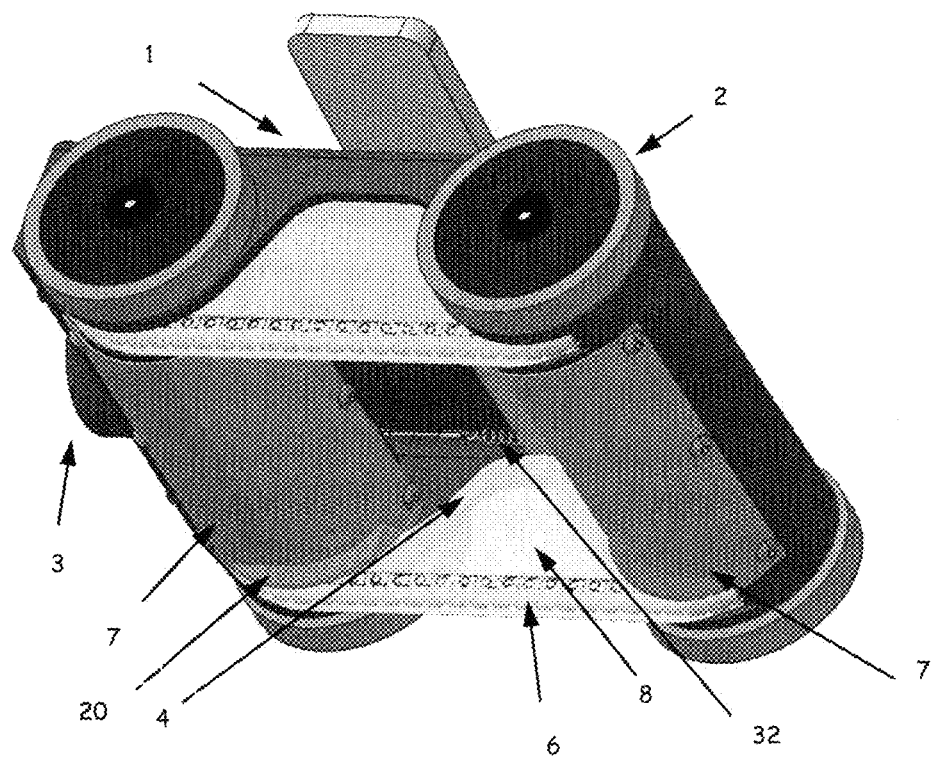
Fig. 7: View of alternate form of invention in which adaptive sealing mechanism is a combination of rigid and flexible components

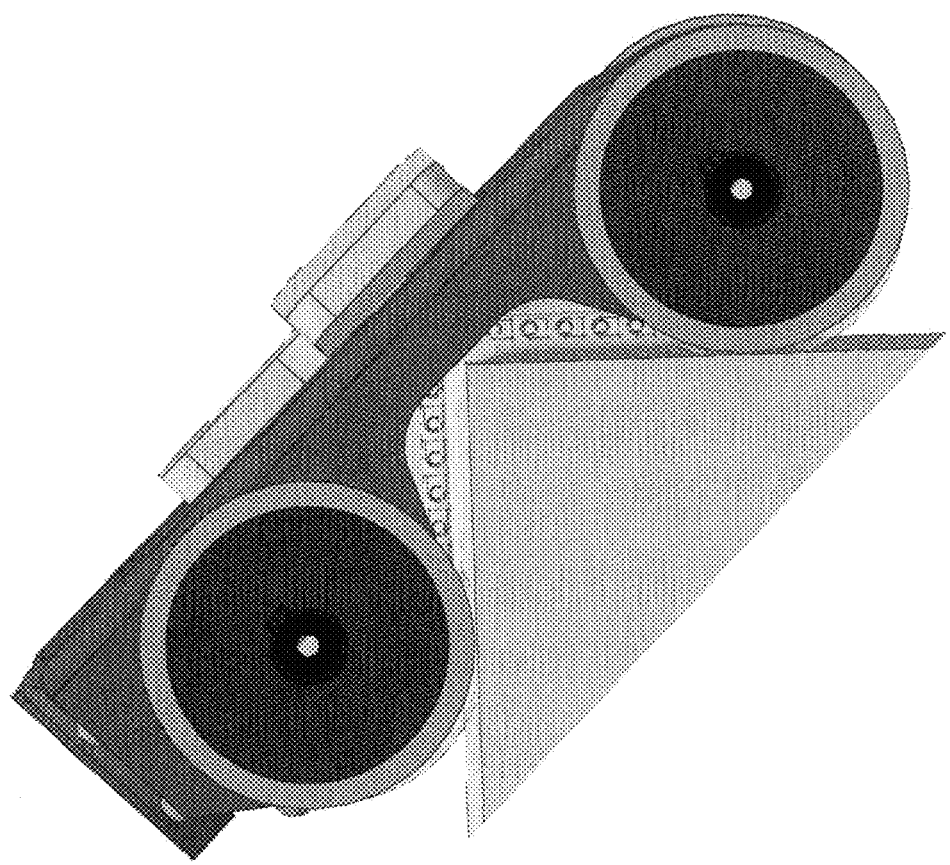
Fig. 8: Climbing vehicle on an irregular surface.

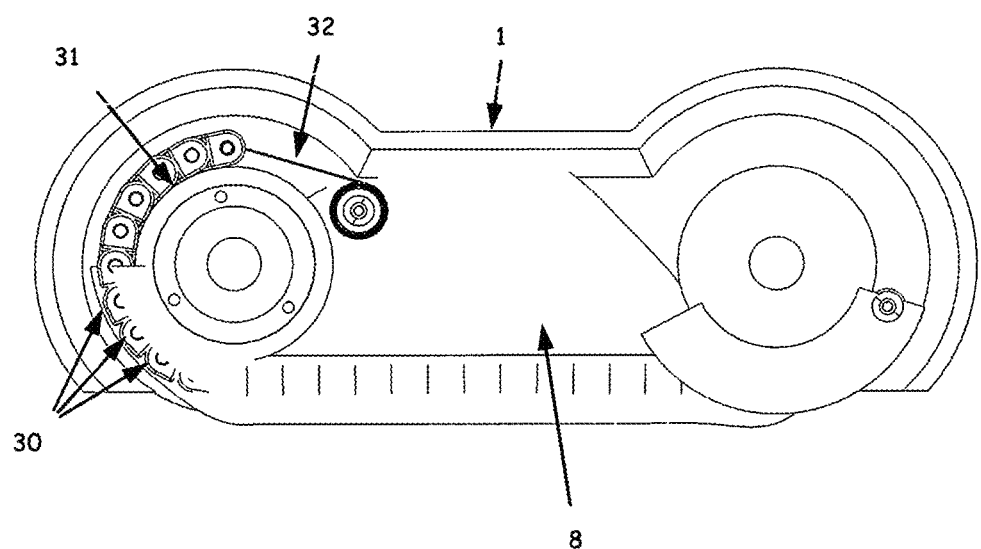
Fig. 9 Details of the Alternate form of the longitudinal seal mechanism

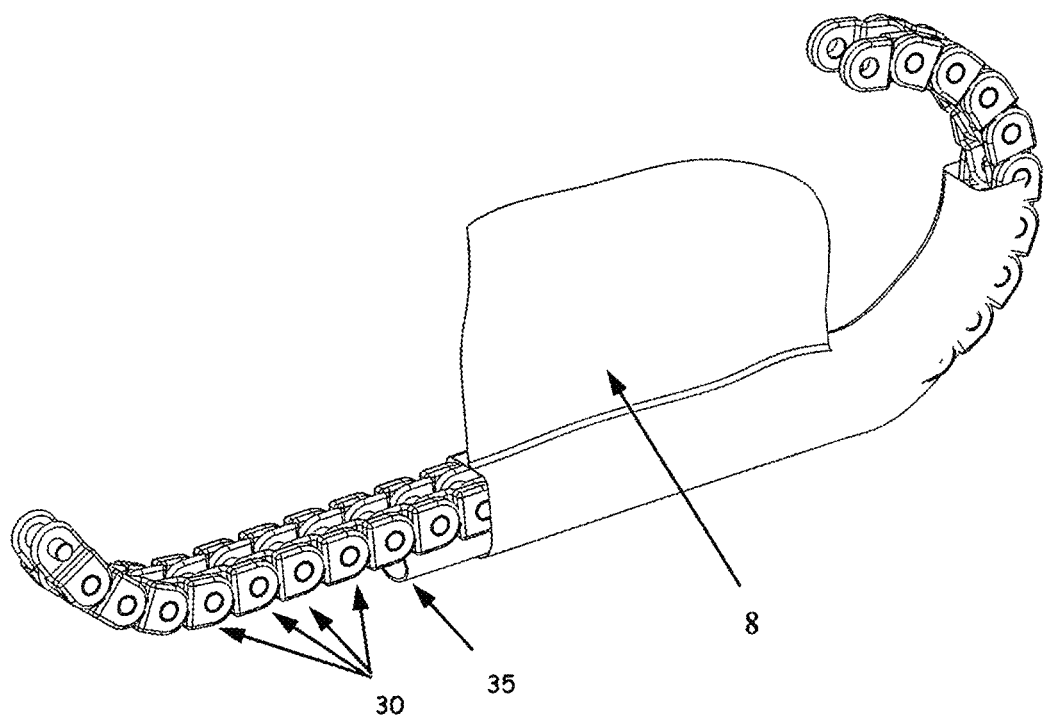
Fig. 10 Details of the Alternate form of the longitudinal seal mechanism isolated from the climbing vehicle

CLIMBING VEHICLE USING SUCTION WITH VARIABLE ADAPTIVE SUSPENSION SEAL

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention applies to the general use of self-propelled vehicles to perform manufacturing, inspection, maintenance or service tasks on structures. This invention further considers these self-propelled vehicles operating in a climbing configuration; that is traversing on inclined, vertical or overhead surfaces such that gravity does not provide the necessary forces directed toward the climbing surface to maintain equilibrium on a desired path. Examples would be climbing a vertical wall or climbing overhead or any other situation in which additional forces (beyond those directed outward from the surface are desired or required to maintain or improve vehicle performance. Finally, this invention applies to the situation in which suction or pressure differential acting against atmospheric pressure provides a majority of this additional force. An example of such an environment to which the present invention is contemplated is performing manufacturing operations on interior or exterior portions of ships. Other environments could include but are not limited to civil structures, wind mills, aircraft, tanks, pipes, structural members and toys.

A variety of climbing vehicles have been proposed to operate in climbing configurations that make use of suction to provide a stabilizing forces. In a general sense, these vehicles could be grouped into three categories; discrete suction devices located on members moving relative to the chassis, one or a smaller number of suction devices created as a chamber generally attached to the vehicle chassis.

In the first category, a number of discrete suction creating elements that are fixed to portions of the vehicle that are moving relative to the chassis. These generally fall into three sub-categories: i) legged devices with one suction device located at the distal end of each leg as shown for example in DE19907437A1, U.S. Pat. Nos. 6,105,695A, 5,121,805A, where the legs can move independently, examples demonstrate four to six legs commonly, ii) bar-type devices with several suction devices located on a bar or track that is moved relative to the chassis, as shown for example in CN2475891Y, U.S. Pat. No. 4,674,949A, WO1983002419A1, WO2013048263A1, which commonly employ two or more translating bars and in some cases a rotating plate, and iii) endless-track devices with suction elements located on an endless track moving relative to the vehicle chassis. This approach has the advantage of keeping the suction element stationary to the climbing surface during a period in which force is applied, allowing better sealing options and can be used to minimize the energy required to create and maintain a suction. The disadvantage is associated with often a more complex propulsion system and the need to attach and create initial suction at the suction devices.

In the second category, one or a small number of suction devices are created in a chamber that in generally attached to and moves with the vehicle chassis as shown for example in U.S. Pat. Nos. 7,775,312B2, 4,926,957A, 5,536,199 and 5,752,577A, 4,926,957, 5,536,199, 5,752,577, 6,102,145, 3,268,023. Several variations to this approach are suggested. This approach has the advantage of allowing for a more simple propulsion system. The disadvantage lies in the requirement to maintain a certain level of seal to minimize the passage of air into the suction chamber. On smooth surfaces, a simple seal is used, with several methods shown to allow a more flexible seal for surfaces with surface variations including inflated and variable geometries in the seal (U.S. Pat. No. 3,268,023). A novel method is demonstrated in U.S. Pat. No. 7,775,312B2 that employs a combination of endless track and rollers to create a seal that provides limited relative motion with respect to the surface and moves the moving seal portions into the vehicle. This device also allows for more variable geometry protruding from the climbing surface through deformation of the seals. While these methods demonstrate the ability to create a suction chamber with a degree of sealed perimeter on flat and not-smooth surfaces, these inventions to not permit significant variations in the surface geometry including the ability to transition over corners in a convex or concave fashion. This capability is a desirable feature and can significantly improve the ability of this type of mobile robotic vehicle.

SUMMARY OF THE INVENTION

The proposed invention consists of a mobile vehicle with wheel or endless-track type propulsion and uses suction to generate stabilizing forces while operating in climbing conditions. The suction is generated in a suction chamber through the use of a fan or pump. The suction chamber uses in part the vehicle chassis and moves with the vehicle chassis. A seal is created around the suction chamber through an adaptive sealing mechanism. The adaptive sealing mechanism consists of a series of links that adapt to the climbing surface geometry and forms a seal at the climbing surface. The links in the adaptive sealing mechanism span a portion of the suction chamber along the longitudinal sides of the vehicle (sides parallel to the primary direction of travel of the vehicle) and are elastically sprung to maintain contact with the surface. The adaptive sealing mechanism links also span the lateral sides of the vehicle at the front and rear of the vehicle to fully enclose the suction chamber. Thus, the suction chamber is maintained even as the mobile vehicle passes over significant geometry changes in the climbing surface, for example transitioning between surfaces that are orthogonally opposed. The fundamental idea of the invention is to create the adaptive sealing mechanism as a multi-degree-of-freedom linkages that span the sides of the vacuum chamber and are sprung elastically to maintain contact with the climbing surface. This allows the vacuum chamber to change shape as needed to accommodate changes in the climbing surface. It creates the need to seal between the links of the sealing mechanism, but this is more readily achieved since there is control over the material properties of the links and surface finish of the links.

BRIEF DESCRIPTION OF DRAWINGS

FIG. 1 shows an isometric view of the basic form of the climbing vehicle.

FIG. 2 shows a side view of the basic form of the climbing vehicle

FIG. 3 shows the basic form of the climbing vehicle on an irregular surface.

FIG. 4 shows a side view of the climbing vehicle showing detail of a basic form of the longitudinal seal mechanism FIG. 5 shows a view of the climbing vehicle showing detail of a basic form of the lateral seal mechanism FIG. 6 shows an isometric view of a second form of the climbing vehicle in which the adaptive sealing mechanism consists of a combination of rigid and flexible components.

FIG. 7 shows a view of the inner portion of the suction chamber of a second form of the climbing vehicle in which the adaptive sealing mechanism consists of a combination of rigid and flexible components.

FIG. 8 shows the climbing vehicle on an irregular surface with an alternate form of the longitudinal seal mechanism.

FIG. 9 shows a side view of the climbing vehicle with parts removed to show detail of an alternate form of the longitudinal seal mechanism FIG. 10 shows an alternate form of a portion of the longitudinal seal mechanism separated from the climbing vehicle chassis Throughout the figures identical reference numerals denote identical components.

DETAILED DESCRIPTION OF THE INVENTION

The invention disclosed here describes a mobile climbing vehicle, robot or platform that is able to traverse climbing surfaces while accommodating variations in the geometry of the climbing surface. In a basic form, the invention consists of a chassis (1), propulsion members (2) shown as wheels in the figures but could also be tracks, port, fan or pump for generating suction (3), suction chamber (4), adhering sealing mechanism (5), consisting of longitudinal seal mechanism (6) and lateral seal mechanism (7) as shown in FIGS. 1 and 2. The lateral direction refers to the direction that is parallel to the propulsion wheel axes while the longitudinal direction refers the direction of a line lying in the plane of the propulsion wheels and passes through axles of the propulsion wheels. The climbing vehicle is operating on a climbing surface that may contain variations in geometry. The chassis forms the body of the vehicle and can be used to mount payloads, tools or other components. In this form, the suction chamber (4) is located inside the propulsion members (2) shown here as wheels.

The suction chamber (4) forms a single suction compartment or region that is able to act on all parts of the climbing surface simultaneously. This is shown in FIGS. 3 and 8 as the robot is traversing a right-angle change in the climbing surface. The lateral seal mechanism (7) and or longitudinal seal mechanism (6) adapts to the climbing surface to match the surface geometry to create the single suction chamber over both flat, planar or non-flat, non-planar climbing surfaces. Two alternative realizations of the longitudinal seal that is able to adapt to the non-flat surface are shown. The first is shown in FIG. 3, in which the longitudinal seal mechanism consists of rigid plates pinned to the robot chassis and are able to pivot. The shapes of the plates are designed to remain conjugate to the climbing surface, even as the climbing surface geometry changes, as shown as a right angle in FIG. 3. FIG. 3 shows a single suction chamber that is formed over the climbing surface consisting of two planes intersecting at right angles. This allows the vacuum region to be maintained continuously throughout the transition over the climbing surface geometry change. Another realization of the longitudinal seal mechanism that is able to adapt to non-regular surfaces is shown in FIG. 8. This longitudinal seal mechanism consists of a chain with many links with that allows the longitudinal seal mechanism to adapt to the surface. This adaption requires a change in length of the longitudinal seal mechanism depending on the surface geometry and this is accommodated with a length-tensioning spring (32), shown in FIG. 9.

FIG. 3 shows the basic form of the climbing vehicle on an irregular surface with the longitudinal seal mechanism adapting to the changing geometry. In addition, FIG. 3 shows how a port for generating suction could be attached to the chassis through a pivot (9) to allow relative rotation between the inlet to the port (3) and the chassis (1).

FIG. 4 shows a side view of the basic form of the climbing vehicle with the drive wheels removed to show the details of the longitudinal seal mechanism. In this basic form, the longitudinal seal mechanism consist of two members, the forward longitudinal seal link (10) and the rear longitudinal seal link (12). The forward longitudinal seal link (10) is connected to the chassis through a pivot (11) that is collinear with the forward propulsion wheel axis, while the rear longitudinal seal link (12) is connected to the chassis through a pivot (13) that is collinear with the rear propulsion wheel axis. A spring (14) connects the forward and rear longitudinal seal links to maintain contact of the seal links with the climbing surface. The forward and rear longitudinal seal links are cam shaped to have preferred shape, smoothly-curved edges to adapt to changes in the climbing surface as they rotate. The longitudinal seal links could be rigid members or elastic members. The forward and rear longitudinal seal links have a smooth surface and slide against each other and the vehicle chassis to form a seal that limits airflow into the suction chamber. If the longitudinal seal links are elastic members, variations in the climbing surface would cause small deformations of the longitudinal seal link members and would increase the seal that limits airflow into the suction chamber.

FIG. 5 shows a side view of the basic form of the climbing vehicle with the drive wheels removed to show the detail of the lateral seal links. In this basic form, the lateral seal mechanism consist of two rigid link members, the forward lateral seal link (20) and the rear lateral seal link (22). The forward lateral seal link (20) is shown as a partial cylindrical section that is connected to the chassis through a pivot (21) that is collinear with the forward propulsion wheel axis, while the rear lateral seal link (22) is shown as a partial cylindrical section that is connected to the chassis through a pivot (23) that is collinear with the rear propulsion wheel axis. A spring (24) connects the forward and rear lateral seal links to maintain contact of the seal links with the climbing surface. The forward and rear longitudinal seal links have smoothly-curved edges to adapt to changes in the climbing surface as they rotate and have a smooth surface and slide against each other and the vehicle chassis to form a seal that limits airflow into the suction chamber. The partial cylinder shape of the lateral seal links is defined such that the solid cylinder portion of the lateral seal link ends at the point that is tangent with the edge of the longitudinal seal link. This keeps the edge of the lateral seal link cylinder tangent with the climbing surface and maintains a seal. The partial cylinder shape of the lateral seal links allows the suction chamber to maintain a seal with the climbing surface when transitioning over sharp edges. A lip (25) made of an inflated tube or deformable material can be placed along the edge of the forward lateral seal link and rear lateral seal link to increase the performance of the seal between the lateral seal mechanism and the climbing surface. Note that in this figure, the lateral seal mechanism is joined to the longitudinal seal mechanism, this may be beneficial to reduce the number of components in the system design but is not a necessary design feature and in general the lateral seal mechanism is formed of bodies separate from the longitudinal seal mechanism.

The longitudinal seal mechanism could also be formed from a series of rigid link members joined in a series connection of higher or lower pair contacts with lower pair contacts including pivot and prismatic joint contacts. Similarly, the lateral seal mechanism could be formed from a series of rigid link members joined in a series connection. The longitudinal and lateral seal mechanism could also contain elastic portions along the surface contact regions to provide improved adaptation to the local climbing surface features. This demonstrates an alternate form of the adaptive seal mechanism.

An alternate form of the invention is shown in FIGS. 6, 7 and 8. In an alternative form, the adaptive sealing mechanism consists of a combination of rigid and elastic members. An embodiment of an alternative form of the invention consists of a chassis (1), propulsion members (2), port, fan or pump for generating suction (3), suction chamber (4), adhering sealing mechanism (5), consisting of longitudinal seal mechanism (6), elastic seal skirt (8) and lateral seal mechanism (7) as shown in FIGS. 6 and 7.

FIG. 8 shows the climbing vehicle with an alternate form the longitudinal seal mechanism climbing over an irregular surface. In this figure, the longitudinal seal mechanism adapts to the climbing surface.

FIG. 9 shows a side view of the climbing vehicle with an alternate form of the longitudinal seal mechanism with the side plate and drive wheels removed to show details of the longitudinal seal mechanism. In this alternate form, the longitudinal seal mechanism is consists of a series of rigid link members (30) called longitudinal links connected like a chain. The longitudinal links at each end of the chain extend around a circular track (31) at the forward and rear ends of the climbing vehicle. The longitudinal links are able to slide along the circular track. Tension is maintained in the series of longitudinal links with a spring (32) such as a constant force spring attached to the end longitudinal links and the chasses. The forward and rear circular tracks are connected to the chassis through a pivot (21) that is collinear with the forward and rear propulsion wheels respectively. The diameter of the forward and rear circular tracks is equal to the diameter of the propulsion wheels less the thickness of the longitudinal seal links such that the longitudinal seal link chain lies tangent to the climbing surface nearest the point of contact of the propulsion wheels with the climbing surface. The forward and rear circular tracks are able to rotate which allows the longitudinal seal link chain to extend and accommodate variations in the climbing surface geometry that effectively change the distance, traveling along the climbing surface, from the forward propulsion wheel contact point to the rear propulsion wheel contact point. The lateral seal links (7) consist of a rigid or elastic link connected to the forward and rear portions of the chassis. Shield (33) plates are located on each side of the longitudinal links to provide a seal against air infiltration into the suction chamber. The elastic skirt (8) surrounds the longitudinal links and is attached to the chassis (1) to keep air from entering the suction chamber.

FIG. 10 shows the alternate form of the longitudinal seal mechanism isolated from the climbing vehicle. A portion of the longitudinal links (30) attached in a series chain are shown. A portion of the elastic skirt (8) is also shown. The elastic skirt allows relative motion between the seal links which adapt to the climbing surface and the chassis that is rigid. The elastic skirt is chosen from a material that can reduce air infiltration while allow flexibility to in-plane bending. Examples are nylon fabric. The elastic skirt could also be chosen from a material that is able to stretch in plane such as rubber. The elastic skirt could contain small ribs that limit the amount of in and out-of-plane bending. It wraps around a portion of the longitudinal links. It also has an inflatable rib (35) that runs along the bottom of the elastic skirt and helps seal between the longitudinal links and the climbing surface.

What is claimed is:

1. A suction-based climbing vehicle for traversing a climbing surface having variations in geometry of the climbing surface such as right angles comprising,
   a chassis,
   at least one propulsion wheel attached to the chassis,
   an adhering sealing mechanism forming a single suction chamber that acts on the climbing surface having two surfaces forming a right angle, the single suction chamber acting on both of these two surfaces simultaneously,
   the adhering sealing mechanism consisting of at least one longitudinal seal mechanism and one lateral seal mechanism attached to the chassis along a longitudinal or lateral direction in sliding contact with the climbing surface and arranged to form a surface-adapting seal for the suction chamber that acts on the climbing surface having two surfaces forming a right angle, the single suction chamber acting on both of these two surfaces can provide suction on all parts of the climbing surface simultaneously.

2. The climbing vehicle of claim 1 wherein an at least one longitudinal seal mechanism is attached along a longitudinal direction of the chassis and at least one lateral seal mechanism is attached along a lateral direction of the chassis.

3. The climbing vehicle of claim 1 wherein the longitudinal seal mechanism is composed of one or more longitudinal seal links.

4. The climbing vehicle of claim 3 wherein the longitudinal seal link is a rigid link.

5. The climbing vehicle of claim 3 wherein the longitudinal seal link is an elastic link.

6. The climbing vehicle of claim 3 wherein the at least one longitudinal seal link attached along a longitudinal direction is connected to the chassis through a pivot that is collinear with the at least one propulsion wheel.

7. The climbing vehicle of claim 1 wherein the lateral seal mechanism is composed of one or more lateral seal links.

8. The climbing vehicle of claim 7 wherein the at least one lateral seal link attached along a lateral direction is connected to the chassis through a pivot that is collinear with the at least one propulsion wheel.

9. The climbing vehicle of claim 7 wherein the at least one longitudinal seal link attached along a longitudinal direction is rigidly connected to the at least one lateral seal link attached along a lateral direction.

10. The climbing vehicle of claim 7 wherein the lateral seal link contains an inflated portion to increase the seal between the longitudinal seal links and the climbing surface.

11. The climbing vehicle of claim 1 wherein an elastic skirt is attached to at least one longitudinal seal mechanism or one lateral seal mechanism.

12. The climbing vehicle of claim 1 wherein the at least one longitudinal seal mechanism or lateral seal mechanism is attached to the chassis with a spring.

13. The climbing vehicle of claim 1 wherein the longitudinal seal mechanisms includes a plurality of longitudinal seal links which are pivotally attached in a series chain, one end of the series chain pivotally attached to the chassis.

14. The climbing vehicle of claim 13 wherein the plurality of longitudinal seal links which are pivotally attached in a series chain are connected at one end to a circular track guide, the circular track guide connected to the chassis through a pivot and a spring connected to the circular track guide to maintain tension in the longitudinal seal links.

15. The climbing vehicle of claim 13 wherein an elastic skirt is connected on one side to the plurality of links which are pivotally attached in a series chain and on another side to the chassis.

16. The climbing vehicle of claim 15 wherein the elastic skirt contains an inflated portion to increase the seal between the longitudinal seal links and the climbing surface.

\* \* \* \* \*